United States Patent [19] | [11] 4,129,931
Carrigan | [45] Dec. 19, 1978

[54] REMOVAL OF PROPELLERS FROM TAPERED SHAFTS

[75] Inventor: Eugene F. Carrigan, Louisville, Ky.

[73] Assignee: Jeffboat, Incorporated, Jeffersonville, Ind.

[21] Appl. No.: 880,954

[22] Filed: Feb. 24, 1978

Related U.S. Application Data

[63] Continuation of Ser. No. 763,131, Jan. 27, 1977, abandoned.

[51] Int. Cl.$^2$ .......... B23P 19/04
[52] U.S. Cl. .......... 29/252
[58] Field of Search .......... 29/252, 203, 264, 265

[56] References Cited

U.S. PATENT DOCUMENTS

| | | | |
|---|---|---|---|
| 1,573,572 | 2/1926 | Rees | 29/264 |
| 1,684,226 | 9/1928 | Johnson | 29/264 |
| 1,750,840 | 3/1930 | Grover | 29/264 |
| 1,865,420 | 6/1932 | Kick | 29/264 |
| 3,772,759 | 11/1973 | Bungan | 29/252 |

FOREIGN PATENT DOCUMENTS

| | | | |
|---|---|---|---|
| 34353 | 1/1929 | France | 29/252 |

*Primary Examiner*—James L. Jones, Jr.
*Attorney, Agent, or Firm*—Laurence R. Brown

[57] ABSTRACT

Apparatus is disclosed to remove a propeller force fit upon a tapered shaft having screw threads projecting from the propeller hub. A cylindrical nut with an inner flange is screwed on the threads. The flange provides a stop located a short distance from the propeller hub thereby limiting movement of the propeller down the tapered shaft at the instant it is broken free. A cylindrical jack is placed about the nut and adjacent an outermost puller plate which is stud bolted to the propeller hub. Thus, the jack can move the plate in a direction pulling said propeller down the tapered shaft until it contacts the stop.

1 Claim, 5 Drawing Figures

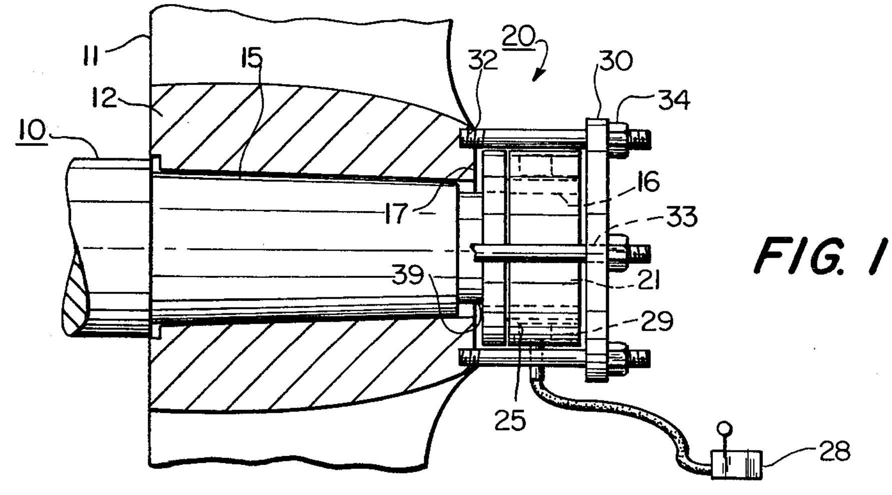
FIG. 1
FIG. 2
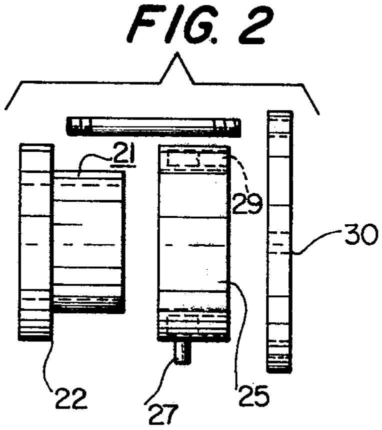
FIG. 3
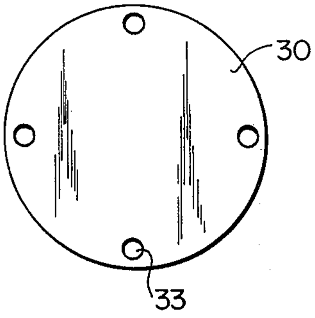
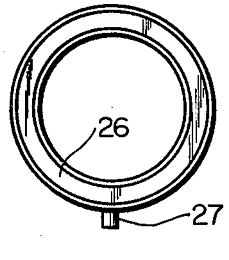
FIG. 4
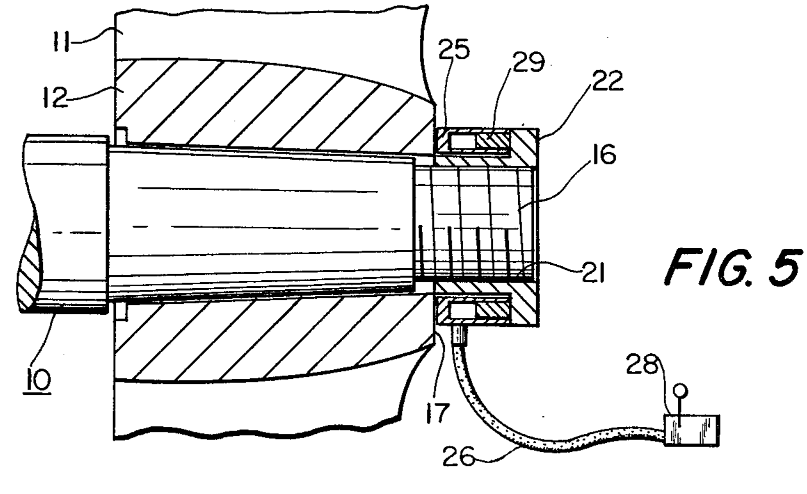
FIG. 5

REMOVAL OF PROPELLERS FROM TAPERED SHAFTS

This is a continuation, of application Ser. No. 763,131, filed Jan. 27, 1977, now abandoned.

This invention relates to ship repairing and more particularly it relates to the removal of propellers force fit upon a tapered shaft.

BACKGROUND OF THE INVENTION

Because in general propellers are bronze and shafts are iron it is conventional in shipyards to remove the propellers by a heat expansion process. Thus, typically, a propeller is manually heated with torches to expand it so that it can be dislodged from forced fit on the tapered shaft by hammering. This has several disadvantages, including energy cost, manpower cost and possible distortion of the propeller. Also, when the propellers are large it is indeed difficult to apply heat uniformly about the entire propeller hub to get the desired uniform thermal expansion characteristics.

Also, when propellers are large the forces necessary to dislodge them mechanically become very high. Cylindrical jacks about the propeller shaft may be used to dislodge the propeller from the taper fit. However, there is a break away action characteristic when the friction fit is overcome and the propeller moves on the shaft. This occurs when the jack is at maximum pressure. Thus, a hydraulic jack under high pressure instantaneously unloaded may rupture. The inertia of a heavy propeller when broken away also may cause it to damage dismount equipment.

OBJECTS OF THE INVENTION

Accordingly, it is a general object of the invention to provide improved apparatus and methods of removing propellers from tapered shafts.

Another object of the invention is to overcome the aforesaid disadvantages in removing propellers.

A more specific object is to provide reliable mechanical apparatus for removal of propellers without damage to the propeller or dismount equipment in the removal process.

Other objects, features and advantages will be found throughout by consideration of the following brief description of the invention and the description set forth throughout this specification and the accompanying drawings.

BRIEF DESCRIPTION OF THE INVENTION

Therefore in accordance with this invention, the propeller is removed from friction force fit on a tapered shaft by rigging a cylindrical jack on the shaft to force the propeller down the tapered shaft to move a small distance toward a protective stop on the shaft.

A cylindrical nut with a flange at one end is screwed upon the threaded propeller shaft with the flange spaced a short distance from the propeller hub to act as the stop. Then a cylindrical axially expandible jack is placed about the nut to abut the flange on one side and a puller plate screwed into the propeller hub by stud bolts on the other side. The jack is then operated to break away the propeller from its friction fit and to move it a small distance against the stop.

THE DRAWING

The detailed description, which follows, makes specific reference to the accompanying wherein:

FIG. 1 is a side view, partly cut away and partly in section, of the end of a tapered propeller shaft rigged to dislodge the propeller from its friction fit;

FIG. 2 is an exploded side view of the elements of the apparatus used for removing the propeller;

FIG. 3 is an end view of the puller plate as seen looking toward the propeller from the end of the shaft;

FIG. 4 is an end view of the cylindrical jack; and

FIG. 5 is a side view, partially cut away and partially in section, of a propeller shaft rigged with the apparatus afforded by this invention to mount a propeller by forcing it into friction fit position onto the tapered shaft.

DETAILED DESCRIPTION OF THE INVENTION

As may be seen from FIG. 1, the tail shaft 10 of a boat (not shown) has mounted thereon a propeller with blades 11 extending from hub 12. The shaft portion 15 is tapered downwardly toward the right to receive the propeller in forced friction fit in the leftmost position, as shown. The hub 12 is keyed on the shaft to prevent rotation by a keyway slot and key not shown.

Threads 16 extend from the free end of the shaft 10 inwardly at least to the end 17 of hub 12 when in its force fit mounted position. During operation of the boat, a nut (not shown), which may be streamlined to reduce turbulence, is normally screwed on the threads 16 to abut the end 17 of hub 12, and is locked in place in a conventional manner such as by brazing to the propeller hub 12, which is normally bronze. As shown, the nut is removed and there is in place thereof an assembly 20 which operates to overcome the friction mount so that the propeller may be removed to the right over the end of tapered shaft portion 15.

The assembly 20, whose separate parts may be viewed in FIG. 2, is mounted in position to remove the propeller. Thus, a cylindrical nut 21 having a flange 22 is screwed in place over the threads 16 on shaft 10 with the flange 22 spaced a small distance (such as about half a centimeter) from the end 17 of hub 12. Thus, the flange 22 serves as a stop for initial movement of the hub when it is broken away from its friction fit and tends to lunge toward the right down the shaft taper.

To provide the force for removal of the propeller from its friction mount position, a cylindrical axially expandible jack 25 (also see FIG. 4) is provided. Preferably, this is a hydraulic jack of a type commercially available. This jack snugly fits about the cylindrical body of nut 21 against flange 22 and is in static position substantially co-extensive in length with the cylindrical body of the nut to reach past the threaded end of shaft 10. The nut body itself also is made long enough to extend past the threaded end 16 of the propeller shaft 10 when in the shown dismount position. A jack operating mechanism is provided such as detachable hydraulic cable 26 connected to fitting 27 and leading to a conventional manually operated hydraulic pump 28.

So that the jack may move the propeller to the right down the tapered shaft, a puller plate 30 (see also FIG. 3) is provided abutting the outer end of jack 25. To hold the plate 30 firmly in place is a set of preferably four stud bolts 31 threaded into the propeller hub at 32 and extending through mating apertures 33 defined in pull plate 30. The pull plate is larger in diameter than the flange 22 and has the apertures 33 outside the cylindrical shaft nut 21 and jack 25 peripheries to avoid interference. The stud nuts 34 are then tightened so that movement of the jack 25 piston structure 29 will exert a force between flange 22 and pull plate 30, which is transmitted by studs 31 to the propeller hub 12, thereby tending to pull it loose from its friction force fit and toward the right down the tapered section 15 of shaft 10.

As may be seen from FIG. 5, parts of the same assembly may be used for forcefully mounting the propeller in forced fit position on the shaft. Forces as high as 10,000 psi can be exerted upon the hub end 17 by jack 25 against the flange 22 of the reversed nut 21 to seat the propeller by movement of about one-half centimeter to the left on the taper. It is preferable to designate a standard pressure and movement, which can be appropriately gaged, so that optimum uniformity of conditions are maintained, depending upon size of the shaft, propeller and strength of the threads, etc.

OPERATION

In operation therefore to rem the propeller from the shaft, reference is made to FIG. 1. After the retainer nut (not shown) on the propeller shaft threaded end 16 is removed, the cylindrical nut 21 is threaded in place to produce a gap 39 between the flange 22 and the outer end 17 of the propeller hub 12.

Then jack 25 is slipped about the cylindrical body of nut 21 to abut flange 22. The stud bolts 31 are threaded into hub 12 and puller plate 30 is registered therewith in abutment with the outer end of jack 25 and is firmly held thereagainst by tightening stud nuts 34.

The jack 25 typically has a maximum movement of about 1.5 cm and can exert a pressure of between 160,000 and 240,000 lbs. Preferably a predetermined higher limit is gaged and if hub 12 does not move, then a relatively small amount of heat can be applied to expand hub 12 and make it possible to move the hub within specified system force tolerances.

As before indicated, when high pressure, such as 240,000 lbs. is applied to the hub 12 to break it away from its frictional mount, as soon as the holding force is broken the hub 12 would otherwise have the full jack pressure exerted there-against with little retarding friction. This will tend to cause the heavy propeller to stroke the removal jigging and damage equipment, or the jack mechanism 25, 29 may become damaged because of the instantaneous release of substantially full load with an otherwise not limited span of movement. Thus, it is critical and essential to interpose the stop flange 22 of cylindrical nut 21 a short distance from the end 17 of hub 12 to arrest the movement of the hub 12 on break away. Should a further degree of movement be desired after break away, the cylindrical nut 21 is simply backed off and the propeller can be moved down the taper further the amount of axial movement provided by jack 25 with modest pressure, while the rigging is in place.

After the propeller is freed for removal, the jigging parts are disassembled and used in the manner aforesaid to remount the propeller in standard position as shown in FIG. 5, after proper servicing.

Having therefore described the invention and its use in such manner as to permit those skilled in the art to adapt it to their use, those novel features believed descriptive of the nature and spirit of the invention are defined with particularity in the appended claims.

What is claimed is:

1. Apparatus for removal of a propeller force fit upon a tapered shaft having screw threads on the end thereof extending at least to the outer end of the propeller hub when force fit in mounted position on said taper, said apparatus comprising in combination, a threaded nut fitted upon the shaft threads, said nut having a cylindrical body with a flange extending therefrom at the inner end spaced from the propeller by a predetermined small distance thereby to provide a stop for limiting movement of said propeller off said tapered shaft away from mounted position, a cylindrical axially expandible jack assembly mounted about said cylindrical nut body adjacent said flange axially expandible from a position near the end of said nut opposite said flange a distance greater than said predetermined small distance, a puller plate abutting the end of said jack at the outer end of said nut, said plate extending beyond the cylindrical dimensions of said flange and jack, a set of stud bolts affixed to said propeller hub and extending through mated apertures defined in said puller plates outside the periphery of said cylindrical jack assembly, and a set of nuts affixed to said stud bolts holding said puller plate firmly against said jack, whereby when said jack is axially expanded said propeller is moved down the taper on the shaft and against said stop by pressure exerted by said jack against said puller plate which in turn is transmitted to said propeller hub by said stud bolts and said stop limits the movement of the propeller while axial forces are being exerted by said jack.

* * * * *